United States Patent Office 2,945,045
Patented July 12, 1960

2,945,045

CHLORINATED 2-METHYL, 3-HYDANTOIN-PROPANE (2)-SULFONIC ACID

M Frank Levy, St. Albans, and George A. Seubert, Jr., Brooklyn, N.Y., assignors to Argus Chemical Corporation, Brooklyn, N.Y., a corporation of New York No Drawing. Filed Apr. 3, 1959, Ser. No. 803,843

3 Claims. (Cl. 260—309.5)

The present invention relates to a new hydantoin derivative and a chlorinated compound derived therefrom. This chlorinated hydantoin has valuable properties as a bleaching agent.

Chlorinated hydantoins are known to be useful bleaching agents, for instance, in laundering or other industrial applications. But the only chlorinated hydantoin on the market to be used for bleaching purposes is dichlorodimethyl hydantoin. This product, however, has a serious drawback; it is hardly soluble in water and, consequently, it is less effective in aqueous media than it should be on the basis of its chloride content.

In an attempt to overcome this shortcoming, the chlorinated hydantoin of levulinic acid has been prepared by one of us (see U.S. Patent 2,798,875). This compound contains a COOH group which confers water solubility to the product at an alkaline pH, as is present in laundering liquids. However, this compound has, so far, no wide practical use, because levulinic acid is an expensive starting material and its use is prohibitive as long as its high price will not be lowered by cheaper manufacturing methods.

It is the object of the present invention to overcome the above mentioned drawbacks and to provide a hydantoin, as a starting material for a bleaching agent, which has sufficient water solubility while being of low price.

It is another object of the invention to make a bleaching agent for laundering and similar purposes which is a chlorine derivative of a hydantoin having a water-solubilizing group other than the COOH group.

Other objects and advantages of the present invention will become apparent from the following detailed description.

The invention is based on the fact that ketones and aldehydes which have a double bond adjoining the CO group, will add $NaHSO_3$ not only to the CO group, but also to the double bond, forming a salt of a sulfonic acid. While the $NaHSO_3$ is easily split off from the CO group by treating the compound with alkali, the $NaHSO_3$ group added to the double bond is much more stable.

Ketones and aldehydes which are useful for the purpose in question are: acrolein, methyl-vinyl ketone, mesityl oxide, 5-methyl-3-hexene-2-one, dypnone, isophorone, 2-cyclohexylidene cyclohexanone, and the like.

The cheapest of all the compounds mentioned above is mesityl oxide and it is consequently the preferred starting material in carrying into effect the preparation of the compound according to the invention. In a first step, we prepare the addition product of mesityl oxide and $NaHSO_3$, whereupon, in a second step, the addition product is converted into the corresponding hydantoin and, in a final step, chlorination of the last-mentioned compound is effected.

The sequence of reactions is as follows:

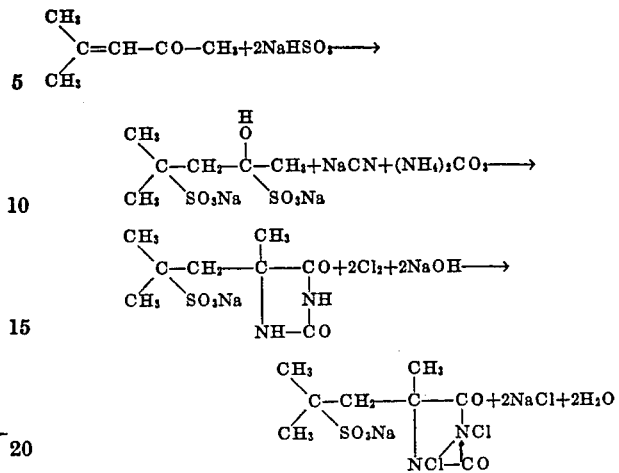

In addition to its low price, the mesityl oxide affords another advantage as starting material for the preparation of the chlorinated hydantoin in accordance with the invention. It has a molecular weight which is neither too low nor too high. When, for instance, unsaturated ketones or aldehydes are used as starting materials, such as methyl vinyl ketone or acrolein, the water solubility of the compounds obtained in the reactions described above is so high that it is extremely difficult to obtain good yields. If, on the other hand, the molecular weight is comparatively high, such as of dypnone, a much larger amount of the end product is required for obtaining the same bleaching effect. The product made from mesityl oxide represents a very satisfactory compromise and is most desirable from an economical point of view.

In the following, the invention will be more fully described in a specific example, but it should be understood that this is given by way of illustration and not of limitation and that many changes in the details can be made without departing from the spirit of the invention.

EXAMPLE

A. *Preparation of the hydantoin*

To a solution of 760 g. (4.0 moles) sodium metabisulfite and 504 g. (4.0 moles) sodium sulfite in 3250 ml. water, was added 392 g. (4.0 moles) mesityl oxide, and stirred at room temperature overnight. The next morning, the solution was made just alkaline by the slow addition of approximately 260 g. ammonium carbonate. To this solution was then added 216 g. (4.4 moles) NaCN and 460 g. ammonium carbonate, and the mixture heated and maintained at 60° C. for three hours, and then at 90° C. for one hour. After cooling, the mixture was lltered, washed twice with water, and allowed to air-dry.

638 g. (63%) of the sodium salt of 5 methyl-5-(isobutyl-2-sulfonic acid) hydantoin were thus obtained. The material gave the theoretical sodium sulfate ash when ashed with $H_2SO_4$ and melts at 259° C.–260° C.

B. *Chlorination of the hydantoin*

To a slurry of 250 g. (1.075 moles) of the above product in 300 ml. water was added, with cooling in an ice bath, 170 g. of 50% NaOH at such a rate that the temperature did not rise above 15° C. The solution was then gassed with $Cl_2$ to a pH of 7, filtered and airdried for several days. There are thus obtained 295 g. of a water soluble product containing 17.5% Cl corresponding to 35% available chlorine. The product is stable at room temperature and starts to decompose at 120° C. It represents according to analysis a mixture of 2 parts of dichloro and 1 part monochloro compound. While it was set forth above that mesityl oxide is the preferred ketone for carrying out the preparation of the hydantoin used as starting material for the chlorinated product, it should be understood that the other CO-containing compounds mentioned are likewise useful in the synthesis of very desirable compounds to be used as bleaching agents for many industrial purposes.

What is claimed is:

1. An alkyl substituted hydantoin containing the water-solubilizing group —SO₃Na and having the formula:

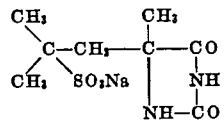

wherein the hydrogen linked to nitrogen is at least partly substituted by chlorine.

2. A bleaching agent consisting of a mixture of monochloro- and dichlorohydantoin of the formulas:

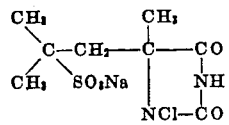

and

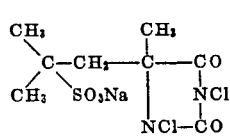

respectively, with a predominant amount of the dichloro compound.

3. A bleaching agent consisting of a mixture of monochloro- and dichlorohydantoin of the formulas:

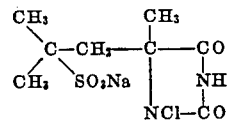

and

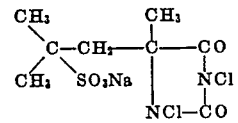

respectively, with the monochloro- and dichlorocompounds being present in the ratio by weight of 1:2.

References Cited in the file of this patent
UNITED STATES PATENTS 2,392,505    Rogers _____ Jan. 8, 1946
2,663,713    White et al. _____ Dec. 22, 1953